United States Patent [19]
Nocek

[11] 3,839,916
[45] Oct. 8, 1974

[54] ATTITUDE BAR POSITIONING AND INSTRUMENT CAGING MECHANISM

[75] Inventor: Stanley J. Nocek, Livingston, N.J.

[73] Assignee: The Bendix Corporation, Teterboro, N.J.

[22] Filed: June 6, 1972

[21] Appl. No.: 260,080

[52] U.S. Cl. .............................................. 74/5.1
[51] Int. Cl. ......................................... G01c 19/26
[58] Field of Search ........................... 74/5.1, 5.14

[56] References Cited
UNITED STATES PATENTS

| 2,207,875 | 7/1940 | Roland | 74/5.14 |
| 2,491,813 | 12/1949 | Jordan | 74/5.1 |
| 2,716,344 | 8/1955 | Seifried | 74/5.1 |
| 3,610,052 | 10/1971 | Strittmatter et al. | 74/5.1 |

FOREIGN PATENTS OR APPLICATIONS

| 656,967 | 2/1938 | Germany | 74/5.1 |

Primary Examiner—Manuel A. Antonakas
Attorney, Agent, or Firm—Anthony F. Cuoco; S. H. Harts

[57] ABSTRACT

A rotatably and linearly actuated mechanism for use with a gyroscopic aircraft attitude indicating instrument is operable for positioning an attitude bar and for caging the instrument and locking the instrument in the caged position without disturbing the position of the bar.

7 Claims, 3 Drawing Figures

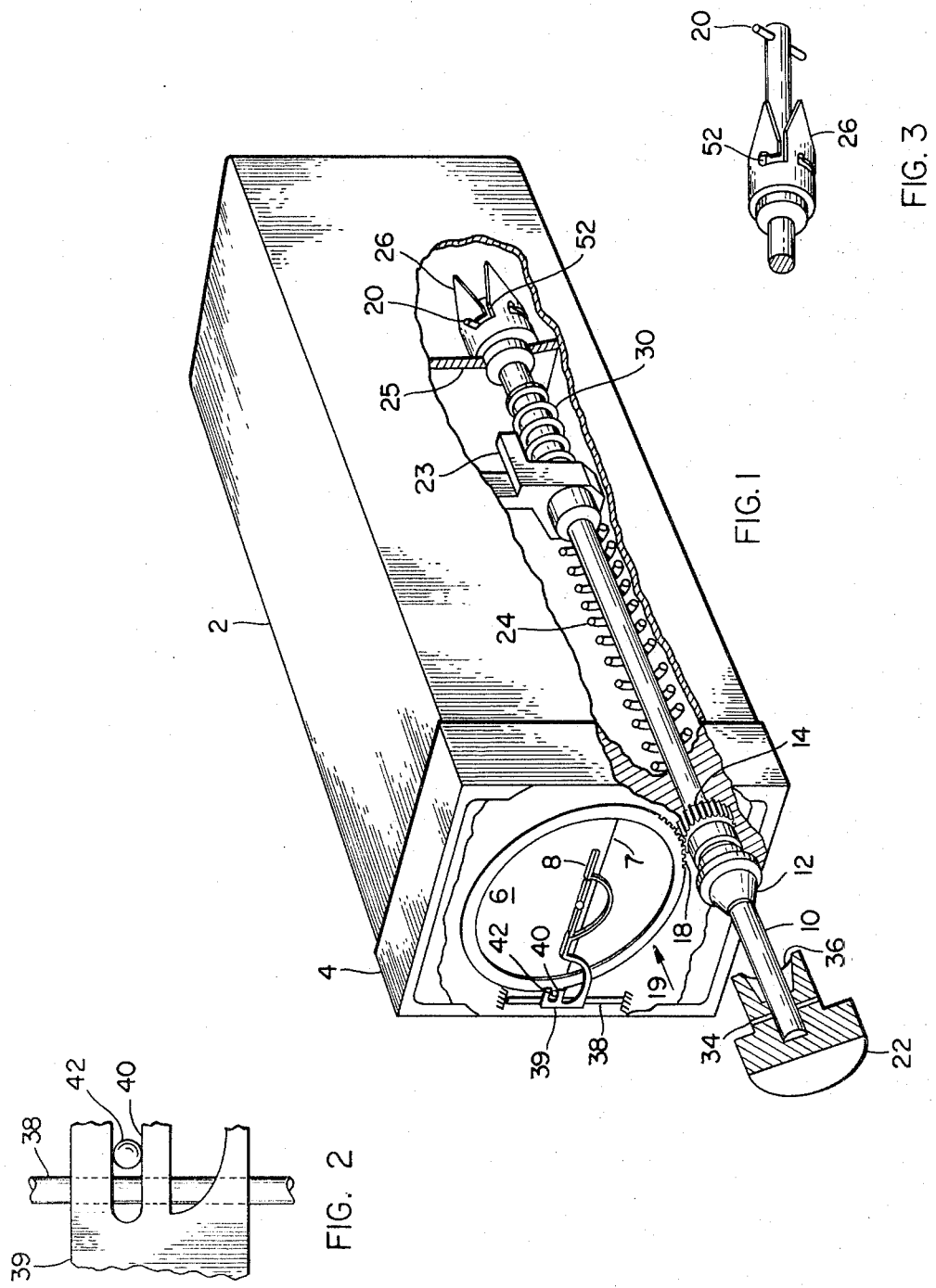

ATTITUDE BAR POSITIONING AND INSTRUMENT CAGING MECHANISM

BACKGROUND OF THE INVENTION

1. Field of the Invention

This invention relates generally to gyroscopic aircraft attitude indicating instruments and, particularly, to means for positioning an attitude bar and for caging the instrument without disturbing the position of the bar.

2. Description of the Prior Art

An aircraft attitude indicating instrument which may use the device of the present invention is shown in U.S. Pat. No. 2,664,558 issued on Dec. 29, 1953 to H. Konet et al. and assigned to The Bendix Corporation, assignee of the present invention. The instrument includes an attitude bar which is visible through a window for indicating the attitude of the craft against a gyro controlled sphere and manually operable means for caging the instrument. The present invention provides means for manually positioning the attitude bar and for caging the instrument without disturbing the bar position.

SUMMARY OF THE INVENTION

This invention contemplates an instrument of the type described and including a spring loaded shaft coupled to attitude bar positioning means. The shaft is rotated through a clutch to actuate said means for positioning the bar and linearly displaced against the spring whereupon the clutch is disengaged and the instrument is caged without disturbing the bar position. With the clutch so disengaged the shaft may be rotated for actuating a locking device to lock the instrument in the caged position.

One object of this invention is to provide means for use with a gyroscopic aircraft attitude indicating instrument for positioning an attitude bar and for caging the instrument and locking the instrument in the caged position without disturbing the bar position.

Another object of this invention is to provide means of the type described which includes a rotatably and linearly displaceable shaft. The shaft is rotated to position the attitude bar and linearly displaced to cage the instrument, after which it is rotated to lock the instrument in the caged position.

Another object of this invention is to rotate the shaft through a clutch to position the attitude bar, with the clutch being disengaged when the shaft is linearly displaced so that caging and locking does not affect the bar position.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is an isometric pictorial representation showing an instrument of the type described and including the device of the invention, with the instrument in the caged, locked position.

FIG. 2 is a diagrammatic representation showing attitude bar positioning means according to the invention.

FIG. 3 is an isometric pictorial representation showing the locking device of the invention, with the instrument in the uncaged, unlocked position.

DESCRIPTION OF THE INVENTION

FIG. 1 shows an aircraft attitude indicating instrument including a case 2 and a bezel 4 mounted in front of case 2. An indicating sphere 6 is supported behind bezel 4 and is gyro controlled for displacement about an axis normal to the longitudinal axis of the instrument to indicate the attitide of the craft relative to, for example, a horizon line 7 marked on the sphere. An attitude bar 8 is supported in front of sphere 6 for vertical displacement as may be desired by the pilot of the craft to adjust his reference. Only as much of the instrument is shown as is necessary for illustrating the features of the invention.

A shaft 10 is rotatably supported within case 2 and bezel 4 and extends beyond the bezel. Shaft 10 is threaded through an external conical clutch member 12 and through a gear 14 coupled thereto, and which gear and clutch member are suitably supported within the bezel. Shaft 10 has a pin 20 secured to the end thereof within case 2 and a knob 22 secured by a pin 34 to the end extending beyond bezel 4. A conical clutch member is shown by way of illustration only. It will be understood that a sawtooth or disc type clutch will work equally as well for the purposes of the invention.

Shaft 10 carries a caging block 23 within case 2 and a spring 24 surrounds the shaft between caging block 23 and bezel 4. Another spring 30 surrounds shaft 10 between caging block 23 and a supporting member 25. Shaft 10 is threaded through a bayonet type locking device 26 which is supported within case 2 by member 25. Locking device 26 is effective for locking the instrument in the caged position. The operation of locking device 26 will be hereinafter explained with reference to FIG. 3.

Knob 22 carries an internal conical clutch member 36 which engages external clutch member 12 when knob 22 is pushed in as will be hereinafter explained. Gear 14 is in meshing engagement with a gear portion 18 of a ring 19 suitably supported within bezel 4 and is effective for rotating ring 19 only when clutch members 12 and 36 are engaged as will now be understood.

Attitude bar 8 is arranged for vertical displacement on a rod 38 which is supported by bezel 4, and which rod extends through a base portion 39 of the bar. Base portion 39 of attitude bar 8 carries a slot 40 which engages a pin 42 secured to ring 19 so that bar 8 rides along rod 38 when ring 19 is rotated as best illustrated in FIG. 2.

FIG. 1 shows the instrument locked in the caged position. Thus, knob 22 is pulled out so that clutch members 12 and 36 are disengaged. Shaft 10 is thus linearly displaced and carries caging block 23 toward bezel 4, compressing spring 24 and allowing spring 30 to expand. The actual caging mechanism is described in the aforenoted U.S. Pat. No. 2,664,558 and is otherwise well known in the art. It will suffice to say for purposes of the present invention that caging block 23 carries cam followers which engage cams fixed to the gyro gimbal and case 2 when knob 22 is pulled as heretofore noted to cage the instrument. If it is desired to lock the instrument in the caged position, shaft 10 is rotated through knob 22 so that pin 20 on shaft 10 engages a slot 52 on locking device 26. Since clutch members 12 and 36 are disengaged, the caging and locking are accomplished without disturbing the position of attitude bar 8.

Unlocking is accomplished by rotating shaft 10 through knob 22 to disengage pin 20 from slot 52 of locking device 26. Shaft 10 is then spring returned to displace block 23 away from bezel 4 to uncage the instrument. When the shaft is so returned, clutch surfaces 12 and 36 engage, whereupon rotation of shaft 10 through knob 32 causes ring 19 to rotate through the meshing action of gear portion 18 thereof and gear 14. Rotational movement of ring 19 causes linear displacement of attitude bar 8 along the length of rod 38 due to the engagement of pin 42 in slot 40 of the attitude bar to position the bar as heretofore noted.

The distinct features of the invention are now obvious. Attitude bar 8 is positioned by rotating shaft 10 through knob 22 when clutch members 12 and 36 are engaged. After attitude bar 8 has been thus positioned, knob 22 is pulled out to disengage the clutch members so as to cage the instrument without disturbing the position of attitude bar 8. When the instrument is thus caged shaft 10 is rotated through knob 22 to engage pin 20 in slot 52 of locking device 26 so that the instrument is locked in the caged position.

Although but a single embodiment of the invention has been illustrated and described in detail it is to be expressly understood that the invention is not limited thereto. Various changes may also be made in the design and arrangement of the parts without departing from the spirit and scope of the invention as the same will now be understood by those skilled in the art.

What is claimed is:

1. Mechanism associated with an indicating instrument, comprising:
   a shaft supported for rotational and longitudinal displacement;
   an indicating bar supported for linear displacement;

means including gear means, means for coupling the gear means to the bar and clutch means engageable upon longitudinal displacement of the shaft in one sense to couple the shaft to the gear means, whereupon rotational displacement of the shaft linearly displaces the bar to a selected position;
   the gear means including a spur gear arranged concentric with the shaft and a ring gear member coupled by the coupling means to the bar and having a gear portion in meshing engagement with the spur gear;
   the bar having a base portion including a slot and the ring member having a pin in engagement with the slot so that rotational displacement of the ring member causes linear displacement of the bar; and longitudinal displacement of the shaft in an opposite sense being effective for disengaging the coupling means, whereupon further displacement of the shaft is ineffective for displacing the attitude bar.

2. Mechanism as described by claim 1, including:
   spring means coupled to the shaft; and
   a force exerted on the shaft to longitudinally displace the shaft in the one sense being effective for loading the spring means, whereupon release of the force causes displacement of the shaft in the opposite sense by the spring means.

3. Mechanism as described by claim 1, including:
   caging means coupled to the shaft; and
   longitudinal displacement of the shaft in the opposite sense being effective for actuating the caging means to cage the instrument.

4. Mechanism as described by claim 3, including:
   locking means; and
   means for coupling the shaft in the locking means for locking the instrument in the caged position.

5. Mechanism as described by claim 4, wherein:
   the locking means includes a fixedly supported member surrounding the shaft, with a portion thereof having a slot; and
   the means for coupling the shaft in the locking means includes a pin on the shaft, the pin being aligned with the slot when the shaft is longitudinally displaced in the opposite sense, whereupon rotation of the shaft causes the pin to engage the slot to lock the instrument in the caged position.

6. Mechanism as described by claim 1, wherein the bar supported for linear displacement includes:
   a fixedly mounted rod extending through the base portion of the bar; and
   the bar riding along the rod when the pin engages the slot and the ring member is rotated.

7. Mechanism as described by claim 1, wherein the clutch means includes:
   an external clutch member arranged concentric to the shaft; and
   an internal clutch member supported by the shaft and engageable with the external clutch member upon longitudinal displacement of the shaft in the one sense.

* * * * *